Jan. 19, 1965   J. S. LEADER ETAL   3,165,877
MOWER BAG ATTACHING DEVICE
Filed Aug. 6, 1963   2 Sheets-Sheet 1
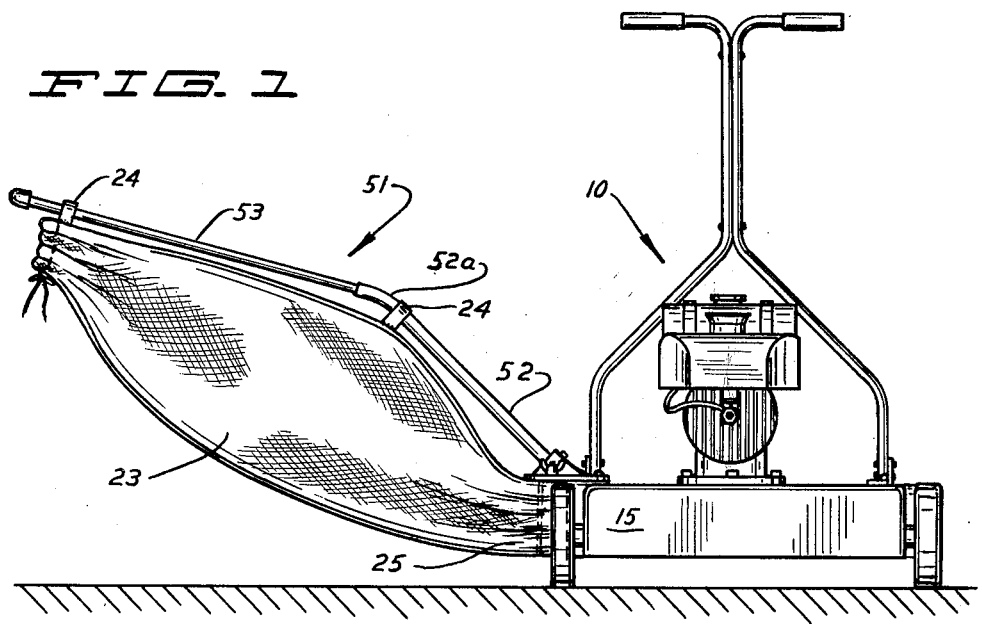
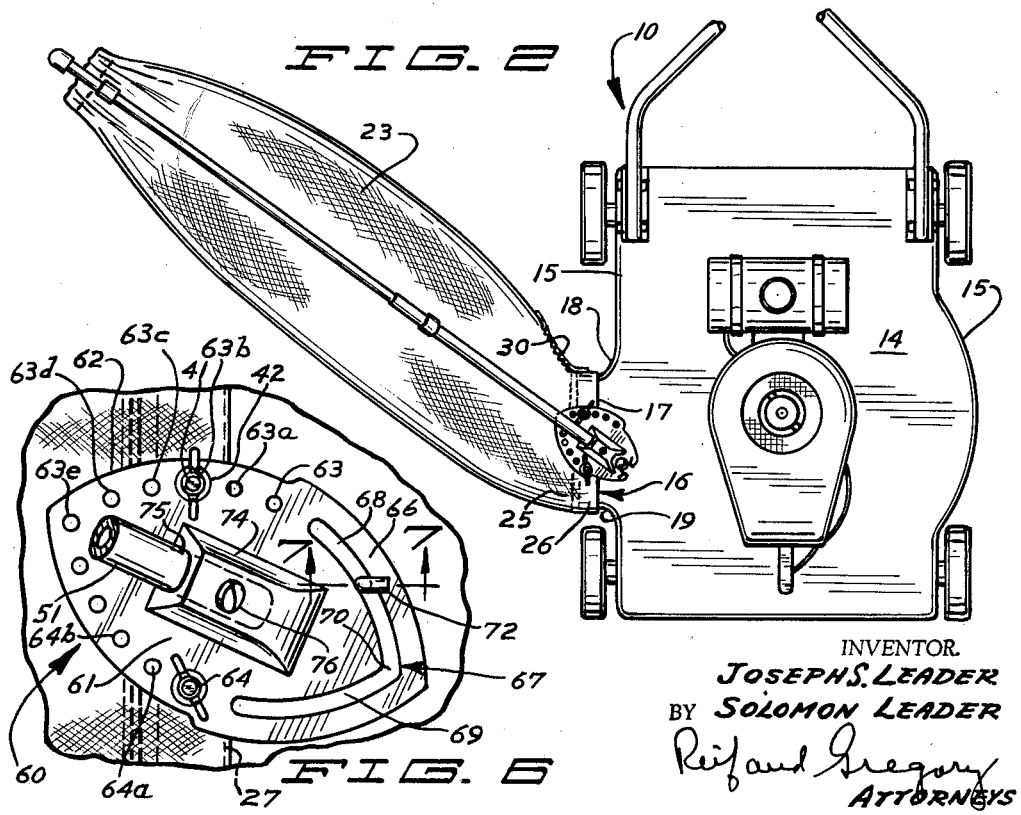
INVENTOR.
JOSEPH S. LEADER
BY SOLOMON LEADER
ATTORNEYS

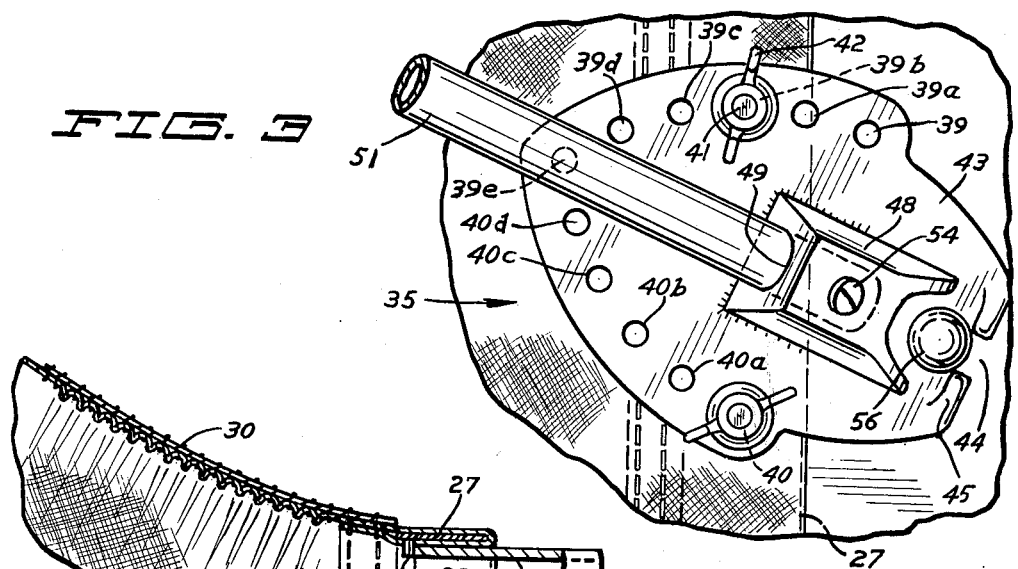
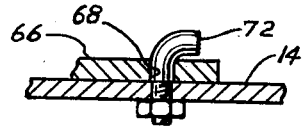
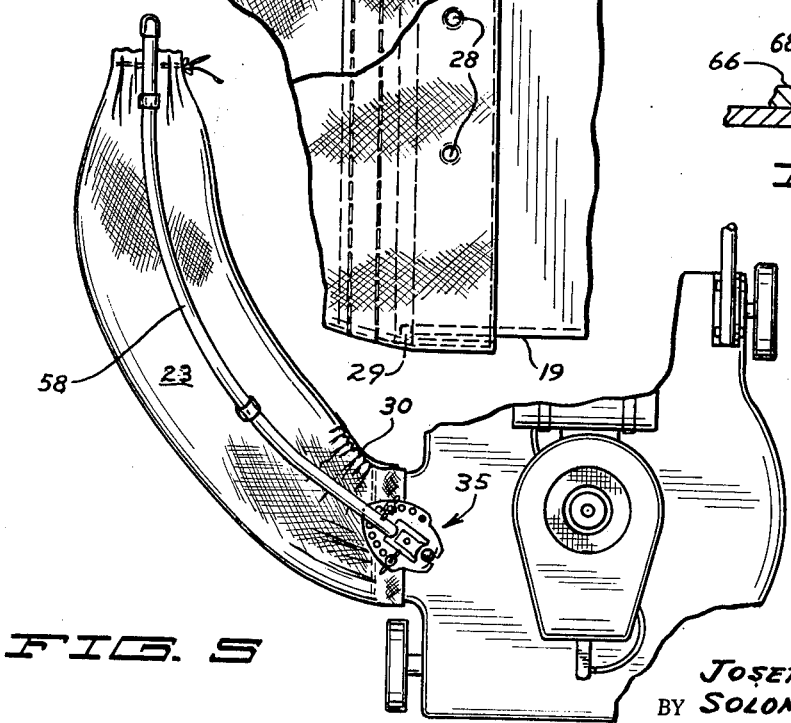

United States Patent Office 3,165,877
Patented Jan. 19, 1965

3,165,877
MOWER BAG ATTACHING DEVICE
Joseph S. Leader, 2116 Xerxes Ave. N., and Solomon Leader, 1114 Russell Ave. N., both of Minneapolis, Minn.
Filed Aug. 6, 1963, Ser. No. 300,350
4 Claims. (Cl. 56—202)

This invention relates to an improvement in a grass catching attachment for a rotary type of grass mower or for what is more commonly known as a lawn mower. More specifically the invention herein has to do with a device for variously positioning the grass catcher in mounting the grass catching attachment onto the mower housing. The grass catcher indicated herein is in the form of a bag having a substantially conventional configuration.

Reference is had to U.S. Patent No. 3,047,998 over which the invention herein represents substantial improvement and of which patent the applicants herein are among the joint inventors thereof.

It is an object of this invention to provide means for attaching a grass catching attachment to a mower housing whereby the grass catching member may be variously positioned relative to the mower.

It is another object of this invention to provide an attaching means for a bag-like grass catcher whereby the bag portion thereof may be adjustably angled relative to a mower in connection with a universal type of bracket for attachment to the discharge outlet of a rotary type of mower.

It is also an object of this invention to provide a grass catching member arranged and constructed to be positioned in various angular positions relative to the discharge outlet of a rotary type of mower and yet provide a clear passage thereinto for the grass cuttings discharged by said mower.

These and other objects and advantages of the invention will be fully set forth in the following description made in connection with the accompanying drawings in which like reference characters refer to similar parts throughout the several views and in which:

FIG. 1 is a view in front elevation showing applicants' device in operating position;

FIG. 2 is the top plan of the view shown in FIG. 1;

FIG. 3 is a broken view in perspective showing detail of applicants' structure on an enlarged scale;

FIG. 4 is a broken view partially in section on an enlarged scale showing detail of applicants' structure;

FIG. 5 is a broken view in plan similar to that in FIG. 2 showing a modification of a portion thereof;

FIG. 6 is a view similar to that in FIG. 3 showing a modification thereof; and

FIG. 7 is a fragmentary view in vertical section taken on line 7—7 of FIG. 6 as indicated.

With reference to the drawings, one embodiment of the applicants' invention is shown in connection with a conventional rotary grass or lawn mower indicated generally by the character 10 and comprising a housing 12 having a top wall 14 and having depending thereabout side walls 15. One of said side walls 15 has projecting outwardly thereof a discharge outlet 16 which is of a common design being generally of an inverted U-shape in elevation having a top wall portion 17 and side wall portions 18 and 19.

An air pervious grass catching bag 23 is shown which in general is of a conventional configuration being of an elongated balloon-like form having integral with an upper outer strip portion thereof lengthwise spaced loops 24. Said bag 23 has a reduced cross sectional dimension at its inlet end portion 25 at which end there is formed a closed loop 26 formed by a stitched reverse fold of the bag material and contained within said loop is a flat collar 27 defining said inlet to correspond to the discharge outlet 16 or more specifically to embrace said discharge outlet. Said collar is preferably formed of sheet metal.

Struck inwardly of said collar at either side thereof are tongue-like stop members 29 to limit the extent to which said collar embraces said discharge outlet. Said collar has a pair of spaced apertures 28 in its upper side extending through the material of the loop 26. With specific reference to FIG. 4, an elastic web 30 is stitched to a rear side portion of said bag as viewed in operating position adjacent the inlet end thereof to gather the material of the bag. Thus when said bag is positioned, as indicated in FIGS. 2 and 5, the material of the bag is gathered in small pleats to prevent any inward bulge of the material which would impede the passage of grass cuttings into the bag. If the bag is positioned at right angles to the mower generally, the elastic web will yield to permit the bag at this point to be stretched.

With specific reference to FIG. 3, applicants' bracket member 35 in the form of a plate is shown having a semi-elliptical or semi-oval portion 37 in plan and having a forward portion 43 of reduced width. Spaced transversely at substantially the widest point of said portion 37 is a pair of apertures 39 and 40 spaced to register with the apertures 28 in said collar 27. With the aperture 40 regarded as a center point, a plurality of spaced apertures 39a–39e including the aperture 39 are spaced to define an arc. The apertures 40–40d are similarly spaced with reference to the aperture 39 as a common center. Said plate member 35 will be secured to the collar 27 by bolts 41 having wing nuts 42, said bolts being disposed through the apertures 28 and the apertures of said plate member in register therewith.

Said forward portion 43 of said plate member is shown having a flat free end portion having an open-ended slot 44 extending therein with raised lip portions 45 adjacent either side of the free end portion of said slot. Said slot is constructed and arranged to lockingly receive therein a post 56 readily formed of a headed bolt upstanding from the housing 14 adjacent the discharge outlet and positioned at a point to be in register with said slot. Said bolt will be conventionally secured to said housing by a nut. Upstanding from said plate member and integral therewith, as illustrated in FIG. 3, is a housing or boss 48 having formed therein an upwardly inclined socket 49 to receive one end portion of a tubular or rod-like bag supporting member 51 with a set screw 54 in said boss to secure said end portion within said socket.

Said rod 51 may be variously formed. It is here shown jointed formed of two portions 52 and 53, with the terminal portion 52a forming a socket to frictionally receive the adjacent end of the rod portion 53. This rod supports the bag 23 by extending through the loops 24. It will be noted in FIG. 1 that the terminal portion of the rod 52 is inclined toward the horizontal positioning the rod portion 53 to suspend the bag 23 outwardly its full length free of ground engagement.

With reference to FIG. 5, a rod 58 as a modification of the rod 51 is shown having a laterally arcuate curvature relative to the bag to position the bag 23 to be quite close to the handle portion of the mower with the free end of the bag being somewhat parallel to the handle of the mower as indicated.

Operation

An essential purpose of this invention is to provide a substantially universal type of bracket for attachment of a grass catching bag to a rotary lawn mower and permit the operator to position the bag at one of various different angular relationships to the mower, and more particularly in view of the handle of the mower.

The collar 27 within the loop 26 will embrace the discharge outlet 17 and overlie the same to the point of the stop members 29. The plate 35 will then be positioned to overlie the collar 27 with the aperture 40 in register with the aperture 28 of said collar nearer the forward end of the mower. Said plate member will be held by the bolt 41 disposed through said registered apertures and secured by the wing nut 42. The apertures 39–39e are all equidistant from the aperture 40. Hence said plate member will be pivoted to whatever angular relationship may be desired in positioning the bag 23. With reference to FIG. 3, it is shown that the apertures 40 and 39b are in register with the apertures 28 in the collar 27. A second bolt 41 will be disposed through the apertures 28 and 39b and said bolt will be secured by a wing nut 42. With the plate member 35 thus positioned in operating position, a point on the housing 14 in register with the slot 44 will be drilled to have secured therein and upstanding therefrom the post 56 having an enlarged head, which post may be readily formed of a conventional type of bolt. Thus the post 56 may be received within the slot 44 as the collar 27 is positioned to embrace the discharge outlet.

The rod 51 will have its lower end disposed in the slot 49 secured therein by the set screw 54. Said rod will first have been disposed through the loops 24 of the bag 23 to hold the bag in suspended position.

The elastic web 30 gathers the inner side portion of said bag 23 in small tucks to prevent the material in the bag from bulging within the bag to interfere with the passage of grass cuttings into said bag.

Thus it is seen that the operator may readily position the grass catching bag 23 at whatever angular relationship to the mower is most desirable to him within a substantial range of adjustment. The apertures 40a–40d are provided for attachment to a mower having a discharge outlet at the left-hand side of the housing as viewed by the operator.

*Modification*

With reference to FIG. 6, a bracket 60 is shown as a modification of the bracket member 35 above described.

Said bracket 60 is also plate-like in form and generally oval or elliptical in plan having a portion 62 having therein a plurality of spaced apertures 63–63e and 64–64d. The apertures 63 and 64 are spaced apart to be in register with the apertures 28 in the collar 27. The apertures 63–63e are positioned to define an arc having the aperture 64 as their common center. The apertures 64–64d are similarly positioned with respect to the aperture 63 as their common center.

The forward portion 66 of said plate member is of a somewhat enlarged dimension in plan having an arcuate slot 67 formed therein. The mid-portion of said arc is indicated by the character 70. The portion 68 of said arc has the same degree of curvature as that defined by the apertures 63–63e and having the aperture 64 as the center of the total extent of the arc thus defined. In like manner the arc portion 69 is an extension of the curvature defined by the apertures 64–64d.

Upstanding from said plate member and integral therewith is a boss 74 identical with said boss 48 and having an upwardly inclined socket 75 formed therein and having a set screw 76 in connection therewith.

A post 72 having a right-angled head portion is shown upstanding from the housing 14 positioned at a point to be in register with the central portion 70 of said arcuate slot 67 when said bracket 60 is in operating position. Said post will have a threaded shank portion of reduced width extending through said housing and secured by a nut.

*Operation*

With reference to the modification as illustrated in FIG. 6, the operation here is on the order of that of the bracket 35. However in the bracket first above decribed there is given a wide range in which to initially position or install the bracket, whereas in the modification here described the position of the bracket in operation may be readily changed. There is greater flexibility in the use of this modified structure.

With the apertures 63 and 64 in register with the apertures 28 of the collar 27 and secured by bolts 41 with their respective nuts 42, the plate member or bracket 60 will be positioned to extend substantially at right angles to the plane of the discharge outlet of the mower. The inlet portion 26 of the bag 23 will be positioned to embrace the discharge outlet and the portion 66 of said bracket 60 and the arcuate slot 67 therein will overlie the housing. At the center point 70 of said arcuate slot 67 a hole will be drilled in the housing and at this point the post 72 will be mounted onto the housing and secured thereto by having a lock nut threaded onto its stem portion extending through the housing as illustrated. With the post 72 centered relative to the slot 67, the operator may now remove the nut and bolt from the aperture 63 and pivot the bracket or plate member 60 to whatever angular relationship is desired in positioning the bag 23. The post 72 will ride in the slot portion 68 of said slot 67. The operator will bring into register with the aperture 28 one of the apertures 63a–63e. The bolt 41 will then be replaced to hold the registered apertures and it will be secured by the nut 42.

Thus it is seen that the operator in the use of the bracket 60 may vary the position of the bag 23 from time to time as he may desire without having to make any change in the position of the post 72. The apertures 64a–64d will be utilized in like manner for a mower having a discharge outlet at the left-hand side thereof.

With reference to FIG. 5, a modification is shown of the rod supporting the bag with the rod here describing a generally arcuate form in plan to bring the free end of the bag into a closer position relative to the handle of the mower.

Thus it is seen that we have provided a simply constructed readily attachable bracket having substantially universal application in mounting a grass catching bag onto a rotary type of lawn mower.

It will of course be understood that various changes may be made in the form, details, arrangement and proportions of the parts, without departing from the scope of applicants' invention which, generally stated, consists in a device capable of carrying out the objects above set forth, in the parts and combinations of parts disclosed and defined in the appended claims.

What is claimed is:

1. A supporting and attaching means for a grass catching bag in connection with the discharge outlet of a rotary type lawn mower, said means comprising a substantially rigid collar defining an inlet for said bag, being integral therewith and corresponding to said discharge outlet, said collar having a pair of spaced apertures in the upper side thereof, a plate member having a pair of spaced apertures in register with said apertures in said collar, said plate member having a plurality of apertures including only one of said first mentioned spaced apertures, said plurality of apertures respectively being spaced relative to said other of said first mentioned spaced apertures to be in register with said apertures in said collar therewith, means swingably securing said plate member to said housing, and means carried by said plate member supporting said bag in extended position.

2. The structure set forth in claim 1,
said plate member having an open-ended slot in the portion thereof overlying said housing,
said plate member having portions of increased thickness adjacent either side of the open end of said slot, and
an upstanding post carried by said housing to be lockingly engaged within said slot.

3. The structure set forth in claim 1,
said last mentioned means comprising a rod,
a socket in said plate member supporting said rod in extended position, and
means connecting said bag with said rod.

4. A supporting and attaching means for a grass catching bag having a substantially rigid collar defining an inlet in register with the discharge outlet of a rotary type lawn mower, said collar having a pair of spaced apertures in the upper portion thereof and said mower having an upstanding post adjacent said outlet, said means comprising
a plate member, said plate member having a pair of spaced apertures in register with said apertures of said collar,
said plate member having a plurality of apertures including only one of said first mentioned spaced apertures, said plurality of apertures disposed to define an arc respectively being spaced relative to said other of said first mentioned apertures to be in register with said apertures in said collar therewith whereby said plate member defines an arc about said other of said first mentioned apertures,
an arcuate slot in said plate member defining an extension of the curvature of the arc of said plurality of apertures and having said other of said first mentioned apertures as a center in common with said plurality of apertures, and
said arcuate slot overlying said housing and having in register therewith said upstanding post.

References Cited by the Examiner
UNITED STATES PATENTS 2,970,422 2/61 Kroll et al. _____ 56—202
3,047,998 8/62 Leader et al. _____ 56—202

ANTONIO F. GUIDA, *Examiner.*

T. GRAHAM CRAVER, *Primary Examiner.*